United States Patent [19]

Roest et al.

[11] 3,957,913

[45] May 18, 1976

[54] PROCESS FOR THE PREPARATION OF THERMOPLASTIC ELASTOMERIC BLOCK COPOLYMERS

[75] Inventors: Bernard C. Roest, Geleen; Herman A. J. Schepers, Stein, both of Netherlands

[73] Assignee: Stamicarbon N.V., Geleen, Netherlands

[22] Filed: Apr. 12, 1974

[21] Appl. No.: 460,523

Related U.S. Application Data

[63] Continuation of Ser. No. 268,172, June 30, 1972, abandoned.

[30] Foreign Application Priority Data

July 2, 1971  Netherlands.......................... 7109143

[52] U.S. Cl. .......................... 260/880 B; 260/665 R
[51] Int. Cl.$^2$............................................ C08L 9/06
[58] Field of Search........ 260/880 B, 94.2 M, 665 R

[56] References Cited
UNITED STATES PATENTS

| | | | |
|---|---|---|---|
| 3,534,965 | 10/1970 | Harrison.......................... | 260/880 B |
| 3,562,204 | 2/1971 | Van Breen....................... | 260/880 B |
| 3,644,322 | 2/1972 | Farrar.................................. | 260/94.2 |
| 3,652,516 | 3/1972 | Farrar.................................. | 260/94.2 |

*Primary Examiner*—Paul R. Michl
*Attorney, Agent, or Firm*—Cushman, Darby & Cushman

[57] ABSTRACT

Polyfunctional anionic initiators for the preparation of elastomeric block copolymers are prepared by reacting a monofunctional anionic initiator, such as secondary butyl lithium, with a monovinyl aromatic compound, such as styrene, or a conjugated diene, such as butadiene or isoprene or mixtures thereof to form a polyuric reaction product which in turn, is reacted with a polyvinyl aromatic compound, such as divinyl benzene. The cross-linked reaction product, prior to use, is reacted with styrene or another monovinyl aromatic compound. The resulting polyfunctional anionic initiators are useful in producing elastomeric block copolymers of the A-B-(A)n type exhibiting good elastomeric properties.

6 Claims, No Drawings

PROCESS FOR THE PREPARATION OF THERMOPLASTIC ELASTOMERIC BLOCK COPOLYMERS

This is a continuation, of application Ser. No. 268,172 filed June 30, 1972 now abandoned.

BACKGROUND OF THE INVENTION

This invention relates to an improved process using a novel polyfunctional anionic initiator for the preparation of thermoplastic elastomeric block copolymers having the general formula A-B-(A)$_n$, in which A is a non-elastomeric polymer block with a glass transition temperature above 25°C, B is an elastomeric polymer block with a glass transition temperature below 10°C, and n denotes a whole or a fractional number, the process including polymerizing a monomer or monomer mixture to form the elastomeric polymer block B and, subsequently, polymerizing a monomer or monomer mixture to form the non-elastomeric polymer blocks A, the process conducted with the aid of a polyfunctional anionic initiator prepared by reacting a monofunctional anionic initiator with a monovinyl aromatic compound, a conjugated diene or both and thereafter with a polyvinylaromatic compound.

Block copolymers having the general formula A-B-(A)$_n$, where A is a non-elastomeric polymer block and B an elastomeric polymer block and n a whole or a fractional number have long been known. If the molecular weights of the non-elastomeric polymer blocks A are chosen between 200 and 100,000 and these of the elastomeric polymer block B between 20,000 and 1,000,000, these block copolymers as such possess elastomeric properties without being vulcanized. This is in contrast with other synthetic elastomers and natural rubber which can only be used as elastomers after being vulcanized.

An additional advantage of these block copolymers as regards processing to molded products is that owing to the elastomeric behavior of non-vulcanized block copolymers the amount of scrap formed is negligible. In addition, the block copolymers can be processed by the methods normally employed primarily with thermoplastic materials, such as extrusion and injection moulding.

The preparation of A-B-(A)$_n$ block copolymers can be carried out according to known processes with both monofunctional and polyfunctional anionic initiators. Use of a mono- or bifunctional anionic initiator in the preparation of the A-B-(A)$_n$ block copolymer yields a linear block copolymer comprising an elastomeric polymer block B carrying a non-elastomeric polymer block A on either side. If the A-B-(A)$_n$ block copolymers are prepared with an anionic initiator having a functionally greater than two, star-shaped block copolymers will be obtained which are composed of a star-shaped elastomeric polymer block B, each branch of which carries a non-elastomeric polymer block A in the end or terminal position. The number of branches of the star-shaped polymer block B and the number of non-elastomeric polymer blocks A then theoretically equals the functionality of the initiator used and, as a consequence is a whole number.

In practice, however, many polyfunctional anionic initiators consist of mixtures of initiators differing in functionality, so that, on the average, the number of non-elastomeric polymer blocks may also be a fractional number.

A method of preparation using a monofunctional anionic initiator normally comprises three process steps, such as either successive polymerization of monomers to the three building polymer blocks of the A-B-A block copolymer, or successive polymerization of monomers to the A-B block copolymer plus subsequent coupling with a suited coupling agent to form the A-B-A- block copolymer.

On the other hand, a method of preparation using a polyfunctional anionic initiator would comprise only two reaction steps, namely polymerization to form the polyfunctional elastomeric polymer block B and subsequent polymerization of the polymer blocks A to form the block copolymer A-B-A. In special cases it might even be possible to perform the whole polymerization in one single process step.

Considered from the point of view of process engineering, application of polyfunctional anionic initiator in the preparation would therefore present a considerable advantage, especially having regard to equipment savings and favorable time econimics. A polyfunctional anionic initiator needs less reaction time for the block copolymerization which is appreciably shorter than when a monofunctional anionic initiator is employed.

The preparation of many polyfunctional anionic initiators presently known requires the presence of one or more polar solvents. After the preparation of the initiators has been completed, the polar solvents cannot, as a rule, be isolated and removed from the initiator to such a degree as to obviate interference with the polymerization of conjugated dienes. This is because even small amounts of polar solvents give rise to a sharp reduction of the cis-1,4 content and, as a consequence, detract considerably from the physical and mechanical properties of the resulting polymers. This explains why use of such polyfunctional anionic initiators, having even a small amount of polar solvent present therewith, in the preparation of block copolymers having the general formula A-B-(A)$_n$ in which the elastomeric polymer block is normally composed of conjugated dienes, does not lead to optimum results.

On the other hand, there exist some polyfunctional initiators which can be prepared in the absence of polar solvents, but the results achieved with these initiators in the preparation of A-B-A block copolymers are usually not optimum. Examples of such intiators have been described in the German patent application No. 2,003,384 laid open to public inspection, the disclosure of which is hereby incorporated by reference. This patent application discloses that polyfunctional initiators can be prepared by allowing a monofunctional lithium-carrying anionic initiator to react with a polyvinyl aromatic compound. To prevent precipitate formation one or several monomers, such as butadiene or styrene, may be used in the preparation of such initiators. According to this above-mentioned patent application, however, the preparation is preferably carried out without such monomers being present. If, nevertheless, the butadiene and styrene monomers are employed, they may be added either before the reaction between the polyvinyl aromatic compound and the monofunctional anionic initiator, or after it. According to this above-mentioned patent application, the polyfunctional anionic initiators thus made may also be employed in the production of elastomeric block copolymers.

However, using the polyfunctional anionic initiators prepared according to the above-mentioned patent application applicants have not succeeded, even after numerous experiments, in producing block copolymers of the configuration A-B-(A)$_n$ that can be employed as elastomers without previous vulcanization.

DETAILED DESCRIPTION OF THE INVENTION

The present invention is directed to providing a process for the preparation of elastomeric block copolymers having the general formula A-B-(A)$_n$ where A is a non-elastomeric polymer block with a number average molecular weight between 200 and 100,000 and a glass transition temperature above 25°C, B is an elastomeric polymer block with a number average molecular weight between 10,000 and 1,000,000 and a glass transition temperature below 10°C, and n denotes a whole or a fractional number, by polymerizing at a temperature between and °C, a monomer, or monomer mixture, to form the elastomeric polymer block B and, subsequently, polymerizing a monomer, or monomer mixture, to form the non-elastomeric polymer blocks A, with the aid of a polyfunctional anionic initiator based on the reaction product obtained by reacting a monofunctional anionic initiator first with a monovinyl aromatic compound and/or a conjugated diene and then with a polyvinyl aromatic compound, is characterized in that, before the preparation of the elastomeric polymer block B, the reaction product of the monofunctional initiator with the monovinyl aromatic compound is allowed to react with a monovinyl aromatic compound in a molar ration of 0.5 to 100 relative to the amount of monofunctional initiator employed.

The elastomeric polymer block B of the A-B-(A)$_n$ block copolymers produced according to the present invention may be formed from any monomer or monomer mixture yielding an elastomeric polymer block during polymerization Preference is given to conjugated dienes having, per molecule, from 4 – 12 and preferably 4 – 8 carbon atoms. Examples of suitable conjugated dienes include isoprene, 1,3-butadiene, 2,3-dimethyl-1,3 butadiene, 1,3-pentadiene, 3-methyl-1,3-pentadiene, 2 methyl-3-ethyl-1,3-butadiene, 1,3-hexadiene, 1,3-heptadiene, 3-butyl-1,3-octadiene, 2-phenyl-1,3-butadiene and 2-methyl-3-isopropyl-1,3-butadiene. Mixtures of conjugated dienes or of conjugated dienes with monovinyl aromatic compounds, like styrene, are also very suitable. The average molecular weight of the resulting elastomeric polymer block B may vary within wide limits. Preferably, however, the molecular weight is chosen between 10,000 and 250,000 and particularly between 15,000 and 150,000.

The non-elastomeric polymer blocks A in the A-B-(A)$_n$ block copolymers produce according to the present invention may be formed from any monomer, or monomer mixture, which upon polymerization yields a non-elastomeric polymer block having a number average molecular weight between 200 and 100,000 and a glass transition temperature above 25°C. For instance, monovinyl aromatic compounds having from 8 – 20 and preferably 8 – 12 carbon atoms per molecule are used and examples of such compounds include styrene and lower alkylsubstituted styrene derivatives such as 3-methyl styrene, 3-ethyl styren, 3,5-dimethylstyrene, 4-propyl styrene, 2,4,6-triethyl styrene, 1-vinyl naphthalene, 2-vinyl naphthalene, and the like. By lower alkyl is meant an alkyl group having 1 – 4 carbon atoms. Derivatives of acrylic acid and methacrylic acid, such as acrylonitrile, methacrylontrile, methylmethacrylate and methylacrylate, may also be used. Also 2-methylstyrene can be used. The non-elastomeric polymer block A may also be a polymer block built up of several segments such as segments formed from styrene and α-methylstyrene. The average molecular weight of the non-elastomeric polymer blocks is preferably chosen between 200 and 100,000, more preferably between 500 and 50,000. The total of the A blocks amounts to about 5 to about 40 weight percent of the block copolymer while the elastomeric B blocks represent from 60 to 95 percent by weight of the block copolymer.

The polyfunctional anionic initiators according to the present invention can be prepared from any monofunctional anionic initiator and normally these monofunctional compounds contain an alkali or earth-alkaline metal atom. Representative anionic initiators are of the formula R-Li wherein R is alkyl having 1 – 12 carbon atoms or allyl or allyl substituted with an alkyl having 1 – 4 carbon atoms. Examples of suitable anionic initiators include methyl lithium, ethyl lithium, butyl lithium, pentyl lithium, hexyl lithium, 2-ethyl hexyl lithium, n-dodecyl lithium, allyl lithium and methallyl lithium.

Preference is given to lithium compounds and particularly to those organo lithium compounds in which the lithium atom is bound to a secondary carbon atom, such as secondary butyl lithium.

In the preparation of the polyfunctional anionic initiators, that can be used according to the present invention, the monofunctional anionic initiators is first allowed to react with a monovinyl aromatic compound and/or a conjugated diene. Suited monovinyl aromatic compounds and conjugated dienes have been mentioned above and include a monovinyl aromatic compound with 8 – 12 carbon atoms per molecule, a conjugated diene with 4 – 8 carbon atoms per molecule or a mixture of monovnyl aromatic compounds and conjugated dienes are used. Preferably, styrene, butadiene or isoprene is used. The ratio between (i) monovinyl aromatic compound, (ii) conjugated diene or their mixture and the amount of monofunctional anionic initiator is not critical. The molar ration will normally be chosen between 1 and 5000, and preferably between 1 and 500. Very good results are obtained with a ration between 5 and 50. Even when such a small amount of monomer is used the monofunctional anionic initiator loses much of its reactivity towards cross-linking the polyvinyl aromatic compound, and a readily reproducible reaction product can be obtained which remains completely in solution.

The polymer thus formed, preferably of low molecular weight, is subsequently cross-linked by reaction with the polyvinyl aromatic compound. Preferred polyvinyl aromatic compounds are those containing up to 26 carbon atoms per molecule. The aromatic group may consist of a single aromatic ring, but compounds containing complex ring systems may also be employed. Compounds with two or more separate aromatic rings are also suitable. Examples of applicable polyvinyl aromatic compounds include 1,3-divinyl benzene, 1,2-divinyl benzene, 1,2,4-trivinyl benzene, 1,2-divinyl naphthalene, 1,3-divinyl naphthalene, 1,8-divinyl naphthalene, 1,3,5-trivinyl naphthalene, 2,4-divinyl diphenyl, 1,2-divinyl-3,4-dimethyl benzene and the like. Preference is given to divinyl benzene.

It is also possible to employ mixtures of suitable polyvinyl aromatic compounds, or mixtures of suitable compounds and a monomer copolymerizable therewith, such as styrene or ethylstyrene. Very good results are obtained with a commercial product consisting of a mixture of the ortho-, meta- and para-isomers of divinyl benzene, diluted - if so desired - with up to 70% wt of ethyl styrene.

The molar ratio between the polyvinyl aromatic compound and the amount of monofunctional anionic initiator used in preparing the reaction product of the latter with the monovinyl aromatic compound (i), or the conjugated diene (ii) can be varied within wide limits, depending among other factors on the desired functionality of the polyfunctional anionic initiator to be formed, the temperature at which the cross-linking reaction is carried out, and the concentration of the polyvinyl aromatic compound. These reaction variables are preferably so chosen that all of the reaction product will remain in solution, and will not separate out in gel-form from the solution. As a rule, the molar ratio can be chosen between 0.25 and 10, and more particularly between 0.5 and 1.0; however, very good results are obtained if the molar ratio lies between 0.6 and 0.8.

The temperature at which the cross-linking reaction is carried out to form the polyfunctional anionic initiator normally lies between 10°C and 150°C, and particularly between 40°C and 120°C. Good results are obtained using a reaction temperature of about 70°C. Depending on the other reaction conditions, the time needed for cross-linking generally lies between 1 second and 24 hours and in an optimum procedure between 3 minutes and 120 minutes. The pressure at which the reaction is conducted is not critical and for the sake of convenience is carried out at ambient pressures. It is to be understood, however, that higher and lower pressures may be used.

According to the present invention the reaction product of the low molecular weight polymer and the polyvinyl aromatic compound must subsequently be reacted with a monovinyl aromatic compound in a molar ratio of 0.5–100 relative to the monofunctional anionic initiator employed, preferably in a molar ratio of 1–50 and more particularly a ratio of 5–25. If the molar ratio is taken above 100 the viscosity of the solution becomes too high for practical purposes.

The monovinyl aromatic compound may be chosen from among the compounds mentioned above; however, preference is given to a monovinyl aromatic compound containing 8 to 12 carbon atoms per molecule, and especially to styrene. Mixtures of the applicable monovinyl aromatic compounds may also be employed. The monovinyl aromatic compound may be the same as or different from the monovinyl compound previously used.

If, according to the invention, the reaction product of the low molecular weight polymer and the polyvinyl aromatic compound is reacted with small quantities of a monovinyl aromatic compound before the preparation of the A-B-(A)$_n$ block copolymer is commenced, elastomeric black copolymers can be obtained which can be used as elastomers even without being vulcanized.

The block copolymers prepared according to the present invention are suited for many applications, and include the production of shaped articles such as bicycle tires, footwear, flooring, domestic articles and as a component of glues and coatings. The block copolymers can also be processed to elastomer fibres.

The following non-limiting examples will further illustrate the principles of the present invention. Unless otherwise indicated, all parts and percentages are by weight. It will be understood that there are two types of examples, the first are comparative examples, that is, not according to the invention and these have been designated with letters, the other examples are numbered and these are according to the present invention.

In the following examples physical and mechanical parameters of the block copolymers so produced were measured by the following techniques: melt index by ASTOM-D 1238 tensile strength, rigidity (E 300), and elongation at break by NEN 5602 and permanent set by NEN 5606.

COMPARATIVE EXAMPLES A and B

In a glass reaction vessel provided with a stirrer and a thermometer, block copolymers having the general formula A-B-(A)$_n$ were prepared by means of polyfunctional anionic initiators obtained by the process described in German patent application No. 2,003,384. The polyfunctional anionic initiators were prepared without solubility-increasing monomers being used. The preparation of the initiator and the block copolymers was carried out with nitrogen atmosphere and in 50 ml of cyclohexane.

The formula used to prepare the polyfunctional anionic initiators is as follows:

| Comparative Example | Secondary butyl lithium (mmoles) | Divinyl Benzene mmoles (DVB) | Ratio DVB/sec. but-li | Temp. °C | Time Min. |
|---|---|---|---|---|---|
| A | 1.32 | 1.91 | 1.45 | 70 | 100 |
| B | 1.32 | 1.14 | 0.86 | 70 | 60 |

With the polyfunctional anionic initiators obtained in the manner set forth above, A-B-(A)$_n$ block copolymers were prepared by successive polymerization of isoprene and styrene and the following results were obtained:

| Comp. Ex. | Isoprene (ml) | Styrene (ml) | Melt Index (g/10'–190°C) | TS (kg/cm$^2$) | E-300 (kg/cm$^3$) | Elongation (%) | Permanent set (%) |
|---|---|---|---|---|---|---|---|
| A | 50 | 15 | 0.06 | 8 | — | 40 | — |
| B | 50 | 10 | 4.73 | 17 | 9 | 1320 | 32 |

It was observed that during preparation the polyfunctional initiator separated out from the solution in gel-form. The A-B-(A)$_n$ block copolymers prepared with these initiators do not possess the mechanical properties needed for end uses as elastomers withou previous vulcanization.

COMPARATIVE EXAMPLES C-E

Comparative Example B was repeated, with the difference, however, that in the preparation of the polyfunctional anionic initiator, styrene was employed as a solubility-increasing monomer. The monofunctional anionic initiator was reacted with this monomer before being reacted with the divinyl benzene. The following parameters we observed:

| Comp Ex | Sec.But.Li (mmoles) | Styrene (ml) | Temp. (°C) | Time (min) | DVB (mmoles) | DVB/sec. but.Li. | Temp. (°C) | Time (min.) |
|---|---|---|---|---|---|---|---|---|
| C | 1.32 | 1.0 | 70 | 60 | 1.14 | 0.86 | 70 | 105 |
| D | 1.32 | 1.0 | 70 | 30 | 1.14 | 0.86 | 70 | 60 |
| E | 0.38 | 0.25 | 70 | 4 | 0.29 | 0.76 | 70 | 60 |

Using the polyfunctional initiators prepared in the above manner, isoprene (50 ml) styrene (10 ml) were polymerized in succession. The resulting A-B-A block copolymers were formed to possess the following properties:

| Comp Ex | Melt Index (g/10'-190°C) | Tensile Strength (kg/cm$^2$) | E 300 (kg/cm$^2$) | Elongation At Break (%) | Permanent Set (%) |
|---|---|---|---|---|---|
| C | 0.26 | 95 | 15 | 1160 | 28 |
| D | 1.07 | 38 | 12 | 950 | 24 |
| E | 0.01 | 48 | — | 2000 | — |

Because of their mechanical properties, the A-B-A block copolymers prepared in the above manner cannot be employed as elastomers without previous vulcanization. It was also observed that the polyfunctional initiators were highly viscous.

COMPARATIVE EXAMPLE F

Comparative example B was repeated, with the difference, however, that after its preparation, the polyfunctional anionic initiator was first contacted with 2 ml of styrene as a solubility-increasing monomer.

The polymerization was continued for 30 minutes at 70°C. Upon addition of styrene, it appeared that the reaction product of the secondary butyl lithium and divinyl benzen separated out in gel-form and did not go into solution. With the aid of the initiator gelated in this way an A-B-(A)$_n$ block copolymer was obtained by successive polymerization isoprene (50 ml) and styrene (10 ml). The properties of the resulting block copolymer are given below:

| Melt Index (g/10'-190°C) | Tensile Strength (kg/cm$^2$) | E 300 (kg/cm$^2$) | Elongation at Break (%) | Permanent Set (%) |
|---|---|---|---|---|
| 2.5 | 16 | 4 | 1640 | 60 |

EXAMPLES 1 – 3

A-B-A block copolymers were prepared by the process according to the present invention. The polyfunctional anionic initiator employed was the reaction product of secondary butyl lithium styrene and divinyl benzene, which, before the start of the block copolymerization, was allowed to react with styrene. The polyfunctional anionic initiator was prepared as follows:

| Example No. | 1 | 2 | 3 |
|---|---|---|---|
| cyclohexane (ml) | 50 | 10 | 50 |
| sec. butyl lithium (mmoles) | 1.32 | 0.68 | 1.32 |
| styrene (ml) | 1.0 | 0.5 | 2.5 |
| reaction time (min) | 2 | 10 | 45 |
| divinyl benzene (mmoles) | 70 | 60 | 70 |
| molar ratio divinyl benzene/sec. but. lithium | 0.57 | 0.69 | 0.86 |
| temp. (°C) | 70 | 60 | 70 |
| time (min) | 45 | 75 | 60 |
| styrene (ml) | 1.0 | 1.0 | 2.0 |
| molar ratio styrene/sec. butyl lithium | 6.8 | 13.1 | 13.6 |
| temp. (°C) | 70 | 60 | 70 |
| time (min) | 15 | 45 | 30 |

A-B-(A)$_n$ Block copolymers were prepared by sequential polymerization of styrene and isoprene in 200 ml of hexane using these polyfunctional anionic initiators. The following results were obtained:

| Example No. | 1 | 2 | 3 |
|---|---|---|---|
| styrene (ml) | 10 | 10 | 15 |
| isoprene (ml) | 50 | 25 | 50 |
| polymerization time (min) | 120 | 120 | 120 |
| polymerization temp. (°C) | 55 | 55 | 55 |
| melt index (g. per 10 min) | 3.6 | .4 | 0.05 |
| tensile strength (kg/cm$^2$) | 193 | 200 | 239 |
| rigidity (E 300) | 13 | 22 | 31 |
| elongation at break (%) | 1140 | 1060 | 900 |
| permanent set (%) | 28 | 18 | 22 |

EXAMPLES 4–5

In the manner of Example 1 a polyfunctional anionic initiator was prepared according to the following formula;

| | |
|---|---|
| cyclohexane (ml) | 50 |
| sec. butyl lithium (mmoles) | 3.2 |
| styrene (ml) | 2.5 |
| reaction time (min.) | 10 |
| reaction temp. (°C) | 70 |
| divinyl benzene (mmoles) | 2.0 |
| molar ratio divinyl benzene/sec. butyl lithium | 0.62 |
| temp. (°C) | 71 |
| time (min.) | 60 |
| styrene (ml) | 5.0 |
| molar ratio styrene/sec. butyl lithium | 14.1 |
| temp. (°C) | 70 |
| time (min.) | 30 |

With the polyfunctional anionic initiators thus produced A-B-(A)$_n$ block copolymers were made as in Example 1 immediately after preparation of the initiator (Example 4), and 7 days after preparation of the initiator (Example 5).

The A-B-(A) block copolymer was made from a mixture of styrene (10 ml) and isoprene (25 ml) in 200 ml of cyclohexane. Polymerization was conducted at 55° C for 120 minutes. The results were as follows:

| Example No. | 4 | 5 (after 7 days) |
|---|---|---|
| melt-index (g/10 min.) | 3.2 | 5.1 |
| tensile strength (kg/cm$^2$) | 217 | 244 |

-continued

| Example No. | 4 | 5 (after 7 days) |
|---|---|---|
| rigidity (kg/cm²) (E 300) | 25 | 29 |
| elongation at break (%) | 910 | 900 |
| permanent set (%) | 24 | 26 |

The above experiment shows that the polyfunctional anionic initiator prepared, according to the present invention by successive reaction of styrene, divinyl benzene and styrene with secondary butyl lithium exhibits good stability on storage.

What is claimed is:

1. Process for preparing elastomeric block copolymers having the general configuration:

$$A - B - (A)_n$$

wherein A is a non-elastomeric polymer block with a number average molecular weight between 200 and 100,000, and a glass transition temperature above 25°C. formed from a monovinyl aromatic compound having from 8–20 carbon atoms per molecule; B is an elastomeric polymer block with a number average molecular weight between 20,000 and 1,000,000, and a glass transition temperature below 10°C. formed from a conjugated diene having from 4–12 carbon atoms in its molecule; and $n$ is a whole or fractional number;

comprising polymerizing, in the presence of a polyfunctional anionic initiator, a monomer to form elastomeric block B and thereafter continuing said polymerization also in the presence of said polyfunctional anionic initiator to polymerize a monomer of mixture of monomers to form polymer blocks A attached to polymer block B;

said polyfunctional anionic initiator prepared by reacting (a) a monofunctional anionic initiator having the formula:

$$R - Li$$

wherein R is an alkyl having 1 – 12 carbon atoms or allyl or allyl substituted with a lower alkyl having 1 – 4 carbon atoms; with (b) a monovinyl aromatic compound having from 8 – 12 carbon atoms per molecule the molar ratio of component (a) being from 1 to 5000 for each mole of component (b), and reacting the polymeric reaction product of (a) and (b) with: (c) a polyvinyl aromatic compound having up to 24 carbon atoms per molecule at a temperature between 10°C. and 150°C. in molar ratio of 0.25 to 10 moles per mole of component (a), and thereafter reacting the cross-linked polymeric reaction product of components (a), (b) and (c) with: (d) a monovinyl aromatic compound having 8 – 12 carbon atoms per molecule in a molar ratio of 0.5 – 100 moles per mole of component (a), to produce said polyfunctional anionic initiator.

2. Process as claimed in claim 1 wherein said monovinyl aromatic compound (b) is styrene.

3. Process as claimed in claim 1 wherein from 2 – 50 moles of monovinyl aromatic compound (d) are used for each mole of monofunctional anionic initiator (a).

4. Process as claimed in claim 3 wherein from 5 – 25 moles of monovinyl aromatic compound (d) are used for each mole of monofunctional anionic initiator (a).

5. Process as claimed in claim 1 wherein said polyvinyl aromatic compound of component (c) is divinyl benzene.

6. Process as claimed in claim 1 wherein said monovinyl aromatic compound (d) is styrene.

* * * * *